United States Patent Office 3,508,885
Patented Apr. 28, 1970

3,508,885
METAL SANDWICH COMPOUNDS CONTAINING
$B_{10}H_{10}S^{2-}$ AND ITS DERIVATIVES
Walter R. Hertler, Kennett Square, Pa., assignor to E. I. du Pont de Nemours and Company, Wilmington, Del., a corporation of Delaware
No Drawing. Continuation-in-part of application Ser. No. 559,730, June 23, 1966. This application Mar. 15, 1967, Ser. No. 623,236
Int. Cl. C01b 6/22
U.S. Cl. 23—361   3 Claims

ABSTRACT OF THE DISCLOSURE

Sandwich compounds of iron, cobalt and nickel and half-sandwich compounds of cobalt, palladium, platinum, manganese and rhenium with icosahedral $B_{10}H_{10}S^{2-}$ fragments having up to four hydrogen atoms substituted by aryl groups, can be made by reacting halogen-containing transition metal compounds with $X[B_{10}H_{11}S]$ or its aryl substituted derivatives, when X is an alkali metal ion, ammonium or hydrogen in the presence of an alkali metal or an alkyllithium compound under anhydrous conditions. Mixed sandwich compounds with cyclopentadienyl groups and icosahedral $B_{10}H_{10}S^{2-}$ groups can also be obtained.

BACKGROUND OF THE INVENTION

This application is a continuation in part of U.S. patent application S.N. 559,730, filed June 23, 1966, now abandoned.

This invention relates to novel metal sandwich compounds and to their preparation. More specifically, the invention concerns metal sandwich compounds comprising selected metals and the icosahedral fragment $B_{10}H_{10}S^{2-}$.

Metal sandwich compounds involving cyclopentadiene have been reported in the literature. See, for example, Dunitz and Orgel, Nature, 171, 121 (1953) and U.S. Patents 2,680,756 and 2,680,758, to mention only a few. These compounds are unique in that the five carbon atoms of the cyclopentadienyl ring are equivalent and each is bonded equally with the metal. Thus, for dicyclopentadienyl-iron, the iron is located between two cyclopentadienyl groups in a parallel planar relationship; hence, the term "metal sandwich." In some compounds, only one cyclopentadienyl group is present, and these are denoted as "half-sandwiches." These structures are usually either neutral or positively charged, in which case a common anion is employed to balance the total charge in the molecule.

It has now been found that the icosahedral fragment $B_{10}H_{10}S^{2-}$ and its substituted derivatives will form a metal sandwich compound with certain metals. The $B_{10}H_{10}S^{2-}$ anion is believed to consist of an eleven-particle icosahedral fragment composed of ten boron atoms and one sulfur atom. This structure results in a void or vacant position at the twelfth position of the icosahedron, and it is believed that the metal of the metal sandwich is bonded to the five atoms positioned around the vacant position. The sulfur atom is believed to be located in the belt nearest the metal atom. In addition, the hydrogen atoms attached to boron atoms can be replaced with halogen, aryl or alkaryl groups, thus obtaining the substituted derivatives referred to above.

DEFINITION OF THE INVENTION

The novel compounds of this invention can be represented by the formula (1)    $M_m[(Ar_aB_{10}H_{10-a-b}X_bS)Y]$ wherein the components are discussed in detail below.

The entity $(Ar_aB_{10}H_{10-a-b}X_bS)$ is the icosahedral fragment consisting of ten boron atoms (B) and one sulfur atom (S). Ar is aryl or alkaryl of up to 12 carbon atoms, preferably phenyl, and is substituted on boron by replacement of hydrogen. The letter $a$ represents the number of Ar substituents on boron and is a small whole number of 0 through 4. X is chlorine, bromine or iodine and is substituted on boron by replacement of hydrogen. The letter $b$ represents the number of X substituents on boron and is a small whole number of 0 through 5. Y is the sandwich-metal containing group and represents the groups M'Q, and when $b$ is zero, $M''(PR_3)_2$ or $M'''(CO)_3$ as well as M'Q. M', M'' and M''' represent the sandwich-metal. M' represents Fe(II), Fe(III), Co(III) or Ni(III). M'' represents Co(II), Pd(II) or Pt(II). M''' represents Mn(I) or Re(I). Q represents the second half of the sandwich and can be $(Ar_aB_{10}H_{10-a-b}X_bS)$, $C_5H_5$ (cyclopentadienyl) or lower alkyl-$C_5H_4$. R represents alkyl, aryl or alkaryl groups, each of up to 12 carbon atoms, which are attached to phosphorus(P) as a part of the ligand $PR_3$.

The entity $[Ar_aB_{10}H_{10-a-b}X_bS)Y]$ is either neutral or anionic, depending upon the valence of the Y component. The icosahedral fragment and its derivatives have a valence of $-2$; while $C_5H_5$ and (lower alkyl)-$C_5H_4$ have a valence of $-1$, and each metal has the positive valence set forth in parentheses in the preceding paragraph. Thus, the valence of the entire entity will depend upon the valence of M'Q or of M'' and M'''. When the entity is anionic, a cation, M, is present solely to fulfill valence requirements. Thus, $m$ represents the valence of the entity in brackets and is a whole number of 0 through 2; and M represents a cation selected from hydrogen, alkali metal, one equivalent of an alkaline-earth metal, ammonium, $GNH_3^+$, $GG'NH_2^+$, $GG_2'NH^+$, $GG_3'N^+$, $G_4P^+$, $G_3S^+$, $G_4As^+$, or $G_4Sb^+$, wherein G is aliphatically saturated hydrocarbyl, and G' is aliphatically saturated hydrocarbyl bonded to N through aliphatic carbon. Preferably, G and G' each contain up to 18 carbon atoms and most preferably up to 12 carbons. Any two G or G' groups in the same cation can also be joined (bonded) to each other directly or through an ethereal oxygen atom to form a divalent aliphatically saturated hydrocarbon group or oxygen-interrupted (mono-oxa) hydrocarbon group of up to 18 carbon atoms and preferably of up to 12 carbons. Most preferably, this divalent group is an alkylene radical of 4-8 carbons. "Aliphatically saturated hydrocarbyl" is defined as a hydrocarbyl group that does not contain any aliphatic unsaturation, i.e., the hydrocarbyl groups can be alkyl, cycloalkyl, aryl, alkaryl or aralkyl.

Examples of the above M cations include methylammonium, cyclopropylammonium, 1-methylheptylammonium, 2-(1-naphthyl)ethylammonium, octadecylammonium, p-ethylanilinium, diisobutylammonium, dicyclohexylammonium, dinonylammonium, morpholinium, dodecamethyleniminium, triisopropylammonium, N-methylpiperidinium, trihexylammonium, dodecyldimethylammonium, tetraisopentylammonium, heptyltrimethylammonium, trimethylpentylammonium, cyclodecyltrimethylammonium, tetramethylphosphonium, tetranaphthylphosphonium, ethylpentamethylene - p - tolylphosphonium, dimethyloctadecylsulfonium, methyltetramethylenesulfonium, triethylsulfonium, tetraphenylarsonium, benzylhexadecyldimethylarsonium, dodecyltriethylarsonium, tetramethylstibonium, N,N - didodecylmorpholinium, dibenzyldimethylstibonium, and the like.

Of the above M cations, (lower alkyl)$_4N^+$ and alkali metal cations are preferred because of availability. The term "lower" used herein refers to groups containing 1-6 carbon atoms.

The compounds of Formula 1 can be divided into several subclasses depending upon the metal component employed.

The compounds of Formula 1 wherein Y is M'Q can be represented by the formula (2)    $M_m[(Ar_aB_{10}H_{10-a-b}X_bS)M'Q]$ wherein the symbols are as defined above. In the compounds of Formula 2, $a$ and $b$ are preferably no more than 3 and only one of $a$ and $b$ is more than zero; Ar is preferably aryl, especially phenyl; and X is preferably chlorine or bromine. An especially preferred class of compounds within Formula 2 are those wherein $a$ and $b$ are each zero, i.e., compounds of the formula (3)    $M_m[(B_{10}H_{10}S)M'Q]$ Most preferred compounds of Formula 2 are those in which Q is $[B_{10}H_{10}S]^{2-}$ and $a$ and $b$ are zero, i.e., compounds of the formula (4)    $M_m[(B_{10}H_{10}S)_2M']$, and especially those wherein M' is Fe(II), Fe(III) or Co(III), and those wherein M is alkali metal or $GG'_3N^+$ wherein G and G' are lower alkyl.

The compounds of Formula 1 wherein Y is $M''(PR_3)_2$ can be represented by the formula (5)    $(Ar_aB_{10}H_{10-a}S)M''(PR_3)_2$ In these compounds, M'' has a valence of +2 which offsets the −2 valence on the icosahedral boron entity; thus, no cation M is needed. In the compounds of Formula 5, preferred values of Ar and $a$ are the same as those described above in regard to Formulas 2–4. Thus, a preferred class of compounds of Formula 5 are represented by the formula (6)    $(B_{10}H_{10}S)M''(PR_3)_2$ wherein R is preferably lower alkyl, phenyl, or lower alkylphenyl. Most preferably, R is lower alkyl. M'' is preferably Co or Pt.

The compounds of Formula 2 wherein Y is $M'''(CO)_3$ can be represented by the formula (7)    $M[(Ar_aB_{10}H_{10-a}S)M'''(CO)_3]$ Here, M''' has a valence of +1, thus the cation M is needed to balance the charge in the compound. Preferably, $a$ is zero in these compounds, but when it is not, the preferred Ar groups are those previously described. Thus, a preferred group of compounds of Formula 7 are represented by the formula (8)    $M[(B_{10}H_{10}S)M'''(CO)_3]$ In Formula 8, M''' is preferably Re; and M is preferably alkali metal or tetra-lower-alkyl ammonium, especially the latter.

Those compounds of the invention having the formula (9)    $M_m{}^v[(Ar_aB_{10}H_{10-a}S)Y']$ wherein $M^v$ is alkali metal and Y' is $M^vQ'$, $M''(PR_3)_2$ or $M'''(CO)_3$, Ar. $m$, and $a$ are as previously defined, $M^v$ is Fe(II), Co(III) or Ni(III) and Q' is $(Ar_aB_{10}H_{10-a}S)$, can be prepared by reacting a boron compound of the formula $M(Ar_aB_{10}H_{11-a}S)$ wherein M is defined as previously (a preferred class of M cations in the reactant can be designated by $M^{v'}$ wherein $M^{v'}$ is hydrogen, alkali metal or tetra lower alkyl ammonium) and Ar and $a$ are as previously defined; with a compound of the formula $M^{v'''}X_2'$, $(R_3P)_2M'''X_2'$, or $M'''(CO)_5X'$ wherein $M^{v'''}$ is Fe(II), Co(II), or Ni(II), X' is chlorine, bromine or iodine, and all other symbols are as defined above; in the presence of an alkali metal (e.g., sodium, potassium or lithium) or an alkyllithium of 1–12 carbon atoms under substantially anhydrous conditions, and in the presence of an inert solvent.

Ordinarily, the alkali metal or alkyllithium is first added to the boron compound in the solvent. The ratio of alkali metal or alkyllithium to the boron compound employed is between 2:1 to 200:1. Preferably, with an alkali metal, the ratio is about 20:1, while with an alkyllithium, it is about 2:1. The temperature range over which this addition can take place is between about −40 to +150° C. The preferred range when an alkali metal is employed is about 70–90° C.; while with an alkyllithium, it as about −10 to +30° C.

The reactant containing the $M^{v'''}$, M'' or M''' metal is then added to the reaction mixture at a temperature of from about −40° to 200° C., and preferably at 0° to 50° C., and in amounts ranging from 1:100 to 100:1 of reactant to product of the first addition, i.e., amounts are not critical. Preferably, stoichiometric amounts are employed.

Exemplary solvents include aromatic or aliphatic ethers, e.g., phenyl ether, dioxane, ethyl ether, anisole, isopropyl ether, 1,2-dimethoxyethane, dimethyl ether of triethylene glycol, tetrahydrofuran, and the like; aliphatic or aromatic hydrocarbons such as benzene, toluene, xylene ethylbenzene, and the like; and tertiary amines such as pyridine, triethylamine, N,N-dimethylaniline, and the like. Preferred solvents are the ethers, especially tetrahydrofuran or 1,2-dimethoxyethane.

To prepare compounds of Formula 2 wherein Q is $C_5H_5$ or lower alkyl-$C_5H_4$, and $b$ is zero, a molar equivalent of cyclopentadiene ($C_5H_6$) or loweralkylcyclopentadiene (e.g. $CH_3C_5H_5$) can be substituted in place of one-half of the boron compound reactant. In the same manner, products in which Q is a different $Ar_aB_{10}H_{10-a}S$ entity than the one shown in Formula 2 can be obtained, i.e., in Formula 2, the product will contain two $Ar_aB_{10}H_{10-a}S$ entities when Q is $Ar_aB_{10}H_{10-a}S$. These two entities may be different.

Compounds of Formula 2 wherein M' is Co(III) or Ni(III), b is 0 and Q is $Ar_aB_{10}H_{10-a}S$, can also be prepared by employing an alkali-metal hydroxide in aqueous solution in place of the alkali metal or alkyllithium. For example, the boron compound is dissolved in about a 5–50 percent aqueous alkali-metal hydroxide solution and then treated with $M^{v'''}X_2'$ wherein $M^{v'''}$ is Co(II) or Ni(II). Other conditions of this reaction are described as previously.

The initial products of the foregoing processes will be those wherein M is alkali metal, or will be the neutral compounds, depending upon the reactants employed. Isolation is carried out by conventional procedures based upon selective precipitation with a precipitating cation, or by extraction with a suitable solvent. Preferred precipitating cations include $Cs^+$, $GG_2'NH^+$, or $GG_3'N^+$ which are usually added in their halide form. These are preferred because they form products of this invention which are relatively insoluble in water and are thus easily obtained. These salts can then be subjected to conventional cation-exchange techniques to obtain other salts or acids of the invention. For example, cation-exchange resins can be prepared containing the desired cation (e.g., hydrogen, sodium, ammonium, and the like), and a solution of the salt whose cation is to be replaced passed through. Alternatively, once the acids of this invention (i.e., where M is hydrogen) are obtained, they can be treated with an equivalent amount of a hydroxide containing the desired replacing cation. When the desired cation is $NH_4^+$, $GNH_3^+$, $GG'NH_2^+$ or $GG_2'NH^+$, then anhydrous ammonia or the appropriate anhydrous amine can be used for the neutralization instead of the hydroxide. The water can then be evaporated leaving the desired salt. In addition, when the base is volatile, an excess can be used and any remaining can be removed by evaporation. In some cases where the compounds of the present invention are isolated from aqueous media, they are obtained in the form of hydrates. The anhydrous compounds can be obtained by conventional dehydrating procedures such as warming the hydrate in a vacuum. The formulae above and in the appended claims are intended to include such hydrated forms.

Compounds of the invention containing X substituents are prepared by reacting the product of any of the foregoing processes with halogen, $X_2$, at a temperature of between about 25 and 100° C. in the presence of a solvent such as water; lower alkanols, e.g., methanol; lower alkanenitriles, e.g., acetonitrile; chlorohydrocarbons, e.g., ethylene chloride and methylene chloride.

The compounds of Formula 2 wherein M' is Fe(III) are prepared by taking any product of the foregoing processes wherein M' is Fe(II) and oxidizing it. Oxidizing agents which may be used include chromium trioxide, hydrogen peroxide, alkali-metal peroxides, potassium permanganate, and alkali-metal or ammonium dichromates.

The starting materials, $B_{10}H_{12}S$, $M[B_{10}H_{11}S]$ and $M[Ar_aB_{10}H_{11-a}S]$ are prepared as described in the following examples.

EXAMPLE A

Preparation of $B_{10}H_{12}S$ and $M[B_{10}H_{11}S]$

Sulfur (six grams) was dissolved in 500 ml. of warm aqueous ammonium sulfide (ca. 20%). The resulting solution was cooled, filtered, and treated portionwise with 24 g. of decaborane(14) with stirring and ice-bath cooling. The rate of addition was such that the resulting foaming remained under control. When the addition was complete, excess 50% aqueous cesium fluoride was added, and the resulting precipitate collected by filtration and recrystallized from water to give 46.4 g. of $Cs[B_9H_{12}S]$. The $Cs[B_9H_{12}S]$ was then pyrolyzed in a bath heated at 200–220° under an atmosphere of nitrogen. When evolution of hydrogen ceased, the resulting $Cs[B_{10}H_{11}S]$ was cooled, dissolved in water, and treated with cold concentrated hydrochloric acid. The resulting precipitate was collected by filtration, rinsed with cold 10% hydrochloric acid, dried under an atmosphere of nitrogen, and sublimed at 100–130°/0.1 mm. to give 11.8 g. of $B_{10}H_{12}S$ as a waxy solid.

The preparation of $B_{10}H_{12}S$ is described more fully in applicant's copending application Ser. No. 490,661, filed Sept. 27, 1965.

EXAMPLE B

Preparation of $M[Ar_aB_{10}H_{11-a}S]$

To a solution of 40 ml. of tetrahydrofuran containing 13 ml. of 1.6 M butyllithium in hexane was added 1.52 g. of $B_{10}H_{12}S$. After stirring for 20 minutes at room temperature, the slurry was cooled in an ice bath and treated with 1.6 g. of dichloro(phenyl)borane using a small amount of benzene to ensure a quantitative transfer. The resulting solution was allowed to warm to room temperature and was then evaporated in vacuo. The residue was extracted with benzene. The extract was filtered and evaporated in vacuo. Crystallization of the residue from heptane gave 720 mg. of colorless crystals of $C_6H_5B_{11}H_{10}S$, M.P. 102.7–105.5°. An additional recrystallization from heptane raised the M.P. to 105.3–106.3°.

Analysis.—Calcd. for $B_{11}H_{15}C_6S$ (percent): B, 50.0; H, 6.35; C, 30.2; S, 13.5; (M.W. 238.3). Found (percent): B, 50.9; H, 6.42; C, 30.2; S, 13.5; (M.W. 237). The ultraviolet spectrum of the product in cyclohexane solution shows absorption at 277 ($\epsilon$ 897), 270 ($\epsilon$ 1320), 245 ($\epsilon$ 5960), and 215 m$\mu$ ($\epsilon$ 14,700). The 60 mc. $H^1$ NMR spectrum of the product in carbon tetrachloride solution shows only absorption characteristic of aromatic protons as a complex resonance at $\tau$2.37–2.78 consistent with the assigned structure.

A mixture of 250 mg. of $C_6H_5B_{11}H_{10}S$, 2.5 g. sodium hydroxide, and 25 ml. of methanol was refluxed for 1.5 hours and then evaporated under reduced pressure. The residue was dissolved in water and treated with excess solid tetramethylammonium chloride. The resulting precipitate was collected by filtration and recrystallized from ethanol to give 120 mg. of colorless plates of $$(CH_3)_4N[C_6H_5B_{10}H_{10}S]$$

Analysis.—Calcd. for $B_{10}H_{27}C_{10}NS$ (percent): B, 35.9; H, 9.04; C, 39.9; N, 4.65; S, 10.6. Found (percent); B, 36.0; H, 9.06; C, 40.2; N, 4.74; S, 10.8. The ultraviolet spectrum of the product in acetonitrile solution shows absorption at 285 (sh., $\epsilon$ 3820), 254 ($\epsilon$ 5500) and 222 m$\mu$ (sh., $\epsilon$ 9850). By repeating the foregoing procedure, up to 4 Ar (here $C_6H_5$) groups can be placed on boron.

The following examples illustrate the products and processes of this invention in further detail. The examples are illustrative only and are not intended to be limiting.

EXAMPLE 1

$[(CH_3)_4N]_2[(B_{10}H_{10}S)_2Fe]$

A mixture of 284 mg. of $CsB_{10}H_{11}S$, 30 ml. of anhydrous tetrahydrofuran, and 1 ml. of a 50% dispersion of sodium in mineral oil was stirred at reflux for 18 hours, cooled, and treated with 500 mg. of anhydrous ferrous chloride. The resulting mixture was refluxed for 15 minutes, cooled, and treated with ethanol. The mixture was then evaporated in vacuo. The residue was extracted with water and pentane. The rose-colored aqueous layer was treated with excess tetramethylammonium chloride and filtered to give 70 mg. of rose colored $$[(CH_3)_4N]_2[(B_{10}H_{10}S)_2Fe]$$

The product was purified by recrystallization from a 2:1 mixture of ethanol and acetonitrile.

Analysis.—Calcd. for $B_{20}H_{44}C_8N_2S_2Fe$ (percent): Fe, 11.1. Found (percent): Fe, 11.2.

EXAMPLE 2

$[(CH_3)_4N]_2[(B_{10}H_{10}S)_2Fe]$

To a stirred mixture of 40 ml. of anhydrous tetrahydrofuran, and 25 ml. of a 1.6 M solution of butyllithium in hexane was added 1.52 g. of $B_{10}H_{12}S$ with cooling in an ice bath. After stirring for ten minutes at room temperature, the mixture was treated with 2.6 g. of ferrous chloride. Heat was evolved, and a dark color appeared. The mixture was evaporated in vacuo, and the residue was extracted with water. The maroon extract was treated with excess tetramethylammonium chloride, and the resulting precipitate was collected by filtration to give 1.345 g. of $[(CH_3)_4N]_2[(B_{10}H_{10}S)_2Fe]$ as a pink solid. Recrystallization from ethanol-acetonitrile gave maroon needles. The infrared spectrum of the product was identical to that of the compound prepared in Example 1.

Analysis.—Calcd. for $B_{20}H_{44}C_8N_2S_2Fe$ (percent): B, 42.9; H, 8.8; C, 19.1; N, 5.6; S, 12.7. Found (percent): B, 42.3; H, 9.0, 8.6; C, 19.0, 19.8, 18.7; N, 5.5; S, 12.6, 12.8. The ultraviolet spectrum of the product in acetonitrile solution shows absorption at 230 m$\mu$ ($\epsilon$ 20,800), 252 m$\mu$ ($\epsilon$ 18,000, sh.), 405 m$\mu$ ($\epsilon$ 97), and 510 m$\mu$ ($\epsilon$ 189). polarographic oxidation of $[(CH_3)_4N]_2[(B_{10}H_{10}S)_2Fe]$ in acetonitrile shows a reversible oxidation with a half-wave potential +0.2 volt corresponding to oxidation to $[(B_{10}H_{10}S)_2Fe]^-$. The infrared absorption spectrum shows complex absorption at 2450–2550 cm.$^{-1}$ (B-H stretch) and sharp peaks at 1015 cm.$^{-1}$ ($B_{10}H_{10}S$ polyhedron) and at 885 cm.$^{-1}$.

EXAMPLE 3

$Cs_2[(B_{10}H_{10}S)_2Fe]$

To a mixture of 120 ml. of tetrahydrofuran and 42 ml. of a 1.6 M solution of butyllithium in hexane in an ice bath was added 4.56 g. of $B_{10}H_{12}S$. After stirring for 15 minutes at room temperature, 2.04 g. of anhydrous ferrous chloride was added, and the resulting mixture was stirred at reflux for 15 minutes. The mixture was evaporated in vacuo, and the residue was extracted with water and filtered. The filtrate was treated with excess cesium sulfate, and the resulting precipitate was recrystallized from water to give 6.29 g. of maroon crystals of $Cs_2[(B_{10}H_{10}S)_2Fe]\cdot H_2O$

*Analysis.*—Calcd. for $B_{20}H_{22}OS_2FeCs_2$ (percent: B, 33.8; H, 3.5; S, 10.0; Fe, 8.7. Found (percent): B, 32.7; 33.3; H, 3.93; S, 10.2; Fe, 8.75.

The ultraviolet spectrum of the product in acetonitrile solution shows absorption at 230 mμ (ε 18,400), 254 mμ (ε 16,300), 415 mμ (ε 88.5), and 508 mμ (ε 183).

EXAMPLE 4

(A) $[(CH_3)_4N][(B_{10}H_{10}S)_2Co]Cs[(B_{10}H_{10}S)_2Co]$

To a mixture of 40 ml. of tetrahydrofuran and 13.5 ml. of a 1.6 M solution of butyllithium in hexane in an ice bath was added 1.52 g. of $B_{10}H_{12}S$. After stirring at room temperature for 20 minutes, the mixture was immersed in an ice bath and treated with 1.1 g. of anhydrous cobaltous chloride. A deep color formed at once. After stirring for ten minutes at room temperature, the mixture was evaporated, and the residual dark oily product was extracted with water and filtered through diatomaceous earth ("Celite"). The deep amber filtrate, which contained $(B_{10}H_{10}S)_2Co^-$ in solution in combination with $Li^+$, was treated with excess tetramethylammonium chloride. The resulting precipitate of $(CH_3)_4N[(B_{10}H_{10}S)_2Co]$ was collected by filtration, dissolved in aqueous acetonitrile and passed through a column packed with a sodium ion-exchange resin, made by pretreating a commercial, strongly acidic ion-exchange resin with excess sodium chloride. The resulting effluent solution of $Na[(B_{10}H_{10}S)_2Co]$ was evaporated in vacuo to a small volumn and treated with excess cesium sulfate. The resulting brown precipitate was recrystallized from water to give 750 mg. of rust-colored crystals of $Cs[(B_{10}H_{10}S)_2Co]$.

*Analysis.*—Calcd. for $B_{20}H_{20}S_2CoCs$ (percent): B, 44.0; H, 4.09; S, 13.0; Co, 12.0. Found (percent): B, 43.1; H, 4.12; S, 12.9; Co, 11.8. The ultraviolet spectrum of the product in acetonitrile solution shows absorption at 226 (ε 9160), 315 (ε 22,600), 370 (ε 268, sh.), and 445 mμ (ε 445). The $B^{11}$NMR absorption spectrum at 32.1 mc. consists of four doublets with relative intensities 4:2:2:2. This spectrum is entirely consistant with the proposed icosahedral structure, with a stereo-chemistry in which the sulfur atom is adjacent to cobalt.

(B) $[(C_6H_5)_4As]_2[(B_{10}H_{10}S)_2Fe]$

To a warm solution of a small sample of $Cs[(B_{10}H_{10}S)_2Fe]$ in water was added an aqueous solution of excess tetraphenylarsonium chloride. A pink precipitate formed at once and was collected by filtration to give $[(C_6H_5)_4As]_2[(B_{10}H_{10}S)_2Fe]$ as a pink solid.

The infrared spectrum of the product shows absorption characteristics of phenyl groups consistent with the proposed structure.

*Analysis.*—Calcd. for $B_{20}H_{60}C_{48}As_2S_2Fe$ (percent): C, 56.3; H, 5.9. Found (percent): C, 52.7; H, 5.5.

EXAMPLE 5

$[(CH_3)_4N]_2[(C_6H_5B_{10}H_9S)_2Fe]$

To a solution of 302 mg. of $(CH_3)_4N[C_6H_5B_{10}H_{10}S]$ in 15 ml. of tetrahydrofuran was added 1 ml. of 1.6 M butyllithium in hexane. After 10 minutes, 200 mg. of ferrous chloride was added, and the mixture was warmed briefly, cooled, and filtered. The filtrate was evaporated in vacuo and the residue was suspended in aqueous tetramethylammonium chloride and filtered to give 215 mg. of $[(CH_3)_4N]_2[(C_6H_5B_{10}H_9S)_2Fe]$ as a red solid. The product was purified by recrystallization from a acetonitrile-ethanol.

*Analysis.*—Calcd. for $B_{20}H_{52}C_{20}N_2S_2Fe$ (percent): C, 36.6; H, 7.97. Found (percent): C, 36.5; H, 8.06.

EXAMPLE 6

$(B_{10}H_{10}S)Pt[P(C_2H_5)_3]_2$

To a mixture of 15 ml. of tetrahydrofuran and 1.3 ml. of a 1.6 M solution of butyllithium in hexane was added 304 mg. of $B_{10}H_{12}S$. After 10 minutes, 1.04 g. of cis-bis-(triethylphosphine)platinum dichloride was added. The resulting solution was refluxed for 5 minutes and then evaporated in vacuo. Water was added to the residue, and the resulting mixture was extracted with methylene chloride. The extract was evaporated, and the residue was recrystallized from a mixture of methylene chloride and acetonitrile to give 340 mg. of yellow plates. An acetonitrile solvate of the desired product was obtained and was heated at 100°/0.1 mm. to give $(B_{10}H_{10}S)Pt[P(C_2H_5)_3]_2$.

*Analysis.*—Calcd. for $B_{10}H_{40}C_{12}P_2PtS$ (percent): B, 18.6; H, 6.92; C, 24.8; S, 5.50; Pt, 33.6. Found (percent): B, 18.3; H, 6.79; C, 25.8, 26.4, 26.2; S, 5.77; Pt, 32.6. The ultraviolet spectrum of the product in chloroform shows absorption at 267 mμ (ε 17,500) and 407 mμ (ε 150).

EXAMPLE 7

$(B_{10}H_{10}S)Co[P(C_2H_5)_3]_2$

To a mixture of 15 ml. of tetrahydrofuran and 3.3 ml. of 1.6 M butyllithium in hexane was added 400 mg. of $B_{10}H_{12}S$. After stirring for 15 minutes at room temperature, the mixture was cooled in an ice bath and treated with 965 mg. of $[(C_2H_5)_3P]_2CoCl_2$. A deep green solution formed at once. The solution was evaporated in vacuo, and the residue was treated with water and filtered to give 1 g. of brown solid. Recrystallization from benzene followed by recrystallization from heptane-benzene and ether-benzene gave 200 mg. of dark brown needles of $(B_{10}H_{10}S)Co[P(C_2H_5)_3]$. The infrared spectrum of the product is nearly identical to that of the product of Example 6.

*Analysis.*—Calcd. for $B_{10}H_{40}C_{12}P_2CoS$ (percent): B, 24.3; H, 9.05; C, 32.3; Co, 13.2. Found (percent): B, 24.0; H, 8.69; C, 32.1; Co, 13.1.

EXAMPLE 8

$(CH_3)_4N[(B_{10}H_{10}S)Re(CO)_3]$

To a solution of 13 ml. of 1.6 M butyllithium in hexane and 40 ml. of tetrahydrofuran was added 1.52 g. of $B_{10}H_{12}S$. After stirring for 15 minutes at room temperature, 3.62 g. of $Re(CO)_5Cl$ was added, and the solution was refluxed for 2.5 hours during which period carbon monoxide evolved. The mixture was evaporated in vacuo, and the residue was dissolved in water and treated with excess tetramethylammonium chloride. The resulting precipitate was collected by filtration, dissolved in acetonitrile and treated with ether. A solid precipitated and was separated by filtration. The filtrate was evaporated in vacuo, and the residue was recrystallized from ethanol twice to give 100 mg. of crystals of $(CH_3)_4N[(B_{10}H_{10}S)Re(CO)_3]$

*Analysis.*—Calcd. for $B_{10}H_{22}C_7NSO_3Re$ (percent): B, 21.9; H, 4.49; C, 17.0. Found (percent): B, 21.9; H, 4.65; C, 20.5. The ultraviolet spectrum of the product in acetonitrile shows only end absorption.

EXAMPLE 9

$Cs[(B_{10}H_{10}S)_2Co]$

A solution of 760 mg. of $B_{10}H_{12}S$ in a minimum of

10% aqueous sodium hydroxide was treated with two volumes of 50% aqueous sodium hydroxide and then added to a solution of 4.5 g. of CoCl₂·6H₂O in a minimum of water. The resulting mixture was filtered through diatomaceous earth ("Celite"), and the filtrate was treated with ½ volume of 50% aqueous cesium hydroxide. The resulting brown precipitate was collected by filtration, dissolved in ethanol, and filtered. The dark filtrate was evaporated, and the residue was extracted with ether and filtered. Evaporation of the filtrate gave 1.61 g. of Cs[(B₁₀H₁₀S)₂Co] identified by comparison of the infrared spectrum with that of an authentic sample. Further purification was achieved by dissolving the product in ethanol, filtering, diluting the filtrate with water, and concentrating on a rotary evaporator at ambient temperature. The resulting crystals were collected by filtration to give 1.25 g. of yellow-orange Cs[(B₁₀H₁₀S)₂Co].

EXAMPLE 10

(CH₃)₄N[(B₁₀H₁₀S)₂Fe]

To a solution of 1.5 g. of chromium trioxide in 30 ml. of water in an ice bath was added a saturated solution of 300 mg. of [(CH₃)₄N]₂[(B₁₀H₁₀S)₂Fe] in acetonitrile. After addition of tetramethylammonium chloride, the mixture was filtered to give 250 mg. of (CH₃)₄N[(B₁₀H₁₀S)₂Fe]

as a dark solid.

*Analysis.*—Calcd. for B₂₀H₃₂C₄NS₂Fe (percent): C, 11.2; H, 7.5; S, 14.9. Found (percent): C, 9.6; H, 7.2; S, 12.2. The ultraviolet spectrum of the product in acetonitrile solution shows absorption at 703 mμ, 330 mμ, and 304 mμ. The product is paramagnetic as indicated by an electron spin resonance study consistent with the assigned structure.

EXAMPLE 11

(A) [(CH₃)₄N]₂[(B₁₀H₇.₅Cl₂.₅S)₂Fe]

Chlorine gas was bubbled through a solution of 200 mg. of [(CH₃)₄N]₂[(B₁₀H₁₀S)₂Fe] in 50 ml. of acetonitrile for four minutes. The solution was evaporated, and the residue was treated with aqueous sodium bisulfite and tetramethylammonium chloride. Filtration gave 255 mg. of lavender-colored solid. Recrystallization from acetonitrile-ethanol gave 120 mg. of maroon crystals. The product was a mixture of chlorinated compounds having the average composition

[(CH₃)₄N]₂[(B₁₀H₇.₅Cl₂.₅S)₂Fe]

*Analysis.*—Calcd. for B₂₀H₃₉C₈N₂S₂Cl₅Fe (percent): B, 32.3; H, 5.85; C, 14.3; Cl, 26.2. Found (percent): B, 31.5; H, 6.00; C, 14.7; Cl, 27.7. The ultraviolet absorption spectrum in acetonitrile shows absorption at 510 mμ (ε 157), 310 mμ (ε 11,300), 272 mμ (ε 10,800), 250 mμ (ε 11,700) and 223 mμ (ε 17,600).

(B) [(CH₃)₄N]₂[(B₁₀H₆.₅Br₃.₅S)₂Fe]

To 16 ml. of 0.125 M bromine in acetonitrile was added 100 mg. of [(CH₃)₄N]₂(B₁₀H₁₀S)₂Fe. A deep green color formed. Benzene was added and the mixture was evaporated in vacuo. The residue was suspended in aqueous tetramethylammonium chloride and filtered to give 200 mg. of violet-colored solid. Recrystallization from acetonitrile-ethanol gave 65 mg. of maroon crystals. The product was a mixture of brominated compounds having the average composition

[(CH₃)₄N]₂[(B₁₀H₆.₅Br₃.₅S)₂Fe]

*Analysis.*—Calcd. for B₂₀H₃₇C₈N₂S₂Br₇Fe (percent): B, 20.5; Br, 53.0; N, 2.65. Found (percent): B, 23.9; Br, 52.9; N, 3.02.

EXAMPLE 12

B₁₀H₁₀SCoC₅H₅

To a solution of 35.5 ml. 1.6 M butyllithium (in hexane) in 40 ml. tetrahydrofuran was added 2.7 g. B₁₀H₁₀S with ice-bath cooling. After 15 minutes, 1.6 ml. cyclopentadiene was added. After an additional 15 minutes 2.3 g. cobaltous chloride was added, the mixture was heated to reflux, cooled, and filtered, and the filtrate evaporated. The residue was washed with water and then extracted with benzene. The benzene extract was chromatographed on neutral alumina using 5:1 benzene-ethylene chloride. Crystallization of the chromatographed product from benzene-cyclohexane gave 340 mg. orange plates of B₁₀H₁₀SCoC₅H₅, MP 267.5–268.5°. The analytical data for carbon, hydrogen, and sulfur were obtained for a separate sample prepared by the above method.

*Analysis.*—Calcd. for B₁₀H₁₀SCoC₅H₅ (percent): B, 39.4; C, 21.9; H, 5.5; S, 11.7 (M.W. 274). Found (percent): B, 38.7; C, 22.8; H, 5.8; S, 11.7 (M.W. (mass spec.), 274; M.W. (cryoscopic in benzene), 272). The H¹ NMR spectrum of the product in acetonitrile-d₃ shows a single resonance peak at 4.48τ (C₅H₅). The ultraviolet spectrum of the product in acetonitrile shows absorption at 324 mμ (ε 431), 287 mμ (ε 24,000), and 232 mμ (ε 6,370).

Examples 1–8 and 12 illustrate the process of the invention which employs an alkali metal or an alkyllithium in an anhydrous medium. In addition to sodium, lithium, potassium, or cesium can be employed. Other alkyllithiums employable in place of butyllithium include methyllithium, isopropyllithium, tert-butyllithium, heptyllithium, dodecyllithium and the like. Examples 1–5 illustrate the use of M$^{VIII}$X₂' as a reactant, which of course leads to products of the invention containing M$^V$ metals. Examples 6 and 7 illustrate the use of the reactant (PR₃)₂M″X₂'

Other (PR₃)₂ groups which may be used in place of P(C₂H₅)₃ include trimethylphosphine, tris(sec-butyl) phosphine, triisopentylphosphine, trioctylphosphine, triphenylphosphine, tri-α-naphthylphosphine, tris(4-biphenylyl)phosphine, tri-m-tolylphosphine, tris(2,5-xylyl)phosphine, tris(2,4,6 - trimethylphenyl)phosphine, diphenyl (ethyl)phosphine, di-p-tolyl(phenyl)phosphine, diethyl (propyl)phosphine, and ethyl(phenyl)(p - tolyl)phosphine. Example 8 illustrates the use of Re(CO)₅X' as a reactant. Mn(CO)₅X' can be employed also in the procedure of Example 8.

Example 12 illustrates the preparation of a mixed sandwich compound wherein cobalt is sandwiched between an icosahedral B₁₀H₁₀S fragment and a cyclopentadienyl residue. Cyclopentadiene can be replaced by alkyl substituted derivatives thereof.

Example 9 illustrates the process of the invention involving the use of an aqueous alkali-metal hydroxide solution in place of the alkali metal or alkyllithium. Potassium hydroxide or cesium hydroxide can be employed in place of sodium hydroxide. A lower alkanol can be used in place of water, e.g., methanol, ethyl alcohol or hexyl alcohol.

Example 10 shows the oxidation of the Fe(II) metal sandwich compound of the invention to the Fe(III) compound.

In Examples 1–9, X' is illustrated by chlorine; however, bromine and iodine are also effective.

Example 5 illustrates the preparation of a compound of the invention having an Ar group. In addition to the phenyl Ar group of Example 5, Ar can be 2-biphenylyl, α-naphthyl, o-, m-, or p-tolyl, 2,4-dimethylphenyl, 3,5-dimethylphenyl, 4-ethylphenyl, and the like.

Example 11 illustrates the process by which X groups replace hydrogens attached to boron.

Examples 1–4, 8 and 9 illustrate the procedure by which one M cation is replaced by another M cation. As shown in Example 4A, specific cation-exchange resins can be prepared and employed. Alternatively, and as exemplified in Examples 1–4, 8 and 9, precipitating cations can be employed, such cations include Rb⁺, Cs⁺, GG₂'NH⁺, $GG_3'N^+$, $G_4P^+$, $G_3S^+$, $G_4As^+$ and $G_4Sb^+$. These are usually employed in their halide salt form.

From the foregoing it is seen that in addition to the examples, specific compounds of the invention include:

$(1-C_{10}H_7B_{10}H_9S)Pt[P(C_3H_7)_3]_2$

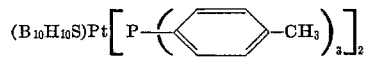

$(B_{10}H_{10}S)Pd[P(CH_3)(C_6H_5)_2]_2$
$(C_2H_5)_3NH[(B_{10}H_{10}S)_2Ni]$
$(B_{10}H_{10}S)NiC_5H_5$
$K_2[C_6H_5B_{10}H_9SFeB_{10}H_{10}S]$
$Ca\{[(C_6H_5)_2B_{10}H_8S]_2Fe\}$
$(C_3H_7)_2NH_2[(B_{10}H_{10}S)Mn(CO_3)]$
$t-C_4H_9NH_3[(p-CH_3C_6H_4B_{10}H_9S)_2Co]$ $\frac{Ba}{2}[(B_{10}H_{10}S)_2Co]$ $(CH_3)_3S[(B_{10}H_{10}S)FeC_5H_5]$
$(C_2H_5)_4P[(B_{10}H_{10}S)FeC_5H_4-CH_3]$
$(B_{10}H_{10}S)Co[P(C_6H_5)_3]_2$
$[(CH_3)_4N]_2[(B_{10}H_8I_2S)_2Fe]$ The products of this invention are useful as dyes. For example, a composite swatch containing nylon, silk and wool fabrics was immersed in a boiling aqueous solution of $Cs_2[(B_{10}H_{10}S)_2Fe]$. The fabric was then washed with soap and water. The nylon was dyed pink, while the silk and wool were dyed tan. When the experiment was repeated using $Cs[(B_{10}H_{10}S)_2Co]$ in place of $Cs_2[(B_{10}H_{10}S)_2Fe]$ fabrics of cellulose acetate, cellulose triacetate, polyacrylonitrile, nylon, silk, and wool were dyed yellow.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compounds having the formula $$M_m'^v[(B_{10}H_{10}S)_2M^v]$$

wherein $M'^v$ is an alkali metal; $M^v$ is Fe(II), Fe(III), Co(III) or Ni(III) and $m$ is the valence of the $$[(B_{10}H_{10}S)_2M^v]$$

entity.

2. The compound of claim 1 having the formula $$Cs[(B_{10}H_{10}S)_2Fe]$$

3. The compound of claim 1 having the formula $$Cs(B_{10}H_{10}S)_2Co$$

References Cited

W. H. Knoth et al.: "Inorganic Chemistry," vol. 4, No. 3, pp. 280–293.

Muetterties et al.: "Chemical & Engineering News," May 9, 1966, pp. 88–97.

OSCAR R. VERTIZ, Primary Examiner

G. O. PETERS, Assistant Examiner

U.S. Cl. X.R.

260—409, 439, 606.5

PO-1050
(5/69)

UNITED STATES PATENT OFFICE
CERTIFICATE OF CORRECTION

Patent No. 3,508,885   Dated April 28, 1970

Inventor(s)   Walter R. Hertler

It is certified that error appears in the above-identified patent and that said Letters Patent are hereby corrected as shown below:

Col. 1, line 44, "dienyl-iron" should be changed to -- dienyliron --;

Col. 4, line 25, there should be a comma after "ene";

Col. 7, line 16, rearrange the title for Example 4 (A) to show that $Cs[(B_{10}H_{10}S)_2Co]$ is a separate compound; line 47, there should be a space after "$B^{11}$"; and Col. 8, line 14, "bis-(triethyl..." should be -- bis(triethyl... --.

Signed and sealed this 20th day of June 1972.

(SEAL)
Attest:

EDWARD M. FLETCHER, JR.
Attesting Officer

ROBERT GOTTSCHALK
Commissioner of Patents